No. 711,306. Patented Oct. 14, 1902.
T. L. GOOD.
POTATO PLANTER.
(Application filed Mar. 25, 1902.)

(No Model.)  2 Sheets—Sheet 1.

Witnesses
Alfred W. Eicker
Frank Turner

Inventor
Thomas L. Good.
by Higdon & Longan Attys.

No. 711,306. Patented Oct. 14, 1902.
T. L. GOOD.
POTATO PLANTER.
(Application filed Mar. 25, 1902.)
(No Model.) 2 Sheets—Sheet 2.
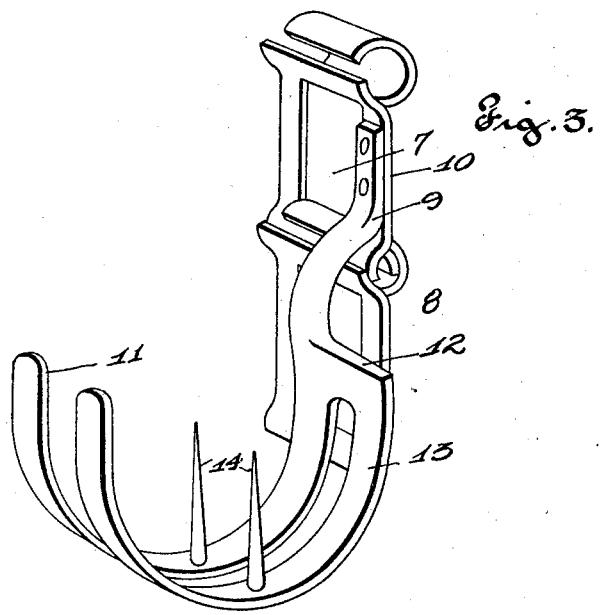
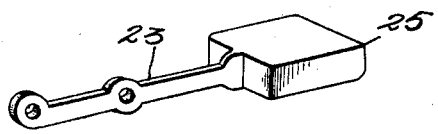
Witnesses
Inventor
Thomas L. Good.
by Higdon & Longan Atty's.

UNITED STATES PATENT OFFICE.

THOMAS LELAND GOOD, OF EDWARDSVILLE, ILLINOIS, ASSIGNOR OF ONE-HALF TO HENRY P. HOTZ, OF EDWARDSVILLE, ILLINOIS.

POTATO-PLANTER.

SPECIFICATION forming part of Letters Patent No. 711,303, dated October 14, 1902.

Application filed March 25, 1902. Serial No. 99,961. (No model.)

*To all whom it may concern:*

Be it known that I, THOMAS LELAND GOOD, of the city of Edwardsville, Madison county, State of Illinois, have invented certain new and useful Improvements in Potato-Planters, of which the following is a full, clear, and exact description, reference being had to the accompanying drawings, forming a part hereof.

My invention relates to potato-planters; and it consists of the novel construction, combination, and arrangement of parts hereinafter shown, described, and claimed.

My object is to construct an improved potato-planter, and specifically my present invention is an improvement upon the dropping mechanism shown in my former patent, dated November 13, 1900, No. 661,799; and my present invention consists of a hopper, a chute into which the hopper discharges, a carrier operating in said chute, pickers upon said carrier, an agitator in said hopper, a presser-arm yieldingly mounted in position to press the potatoes onto said pickers, heaters in position to knock the potatoes off of said pickers, a dropper-plate for regulating the passage of the potatoes from said chute, and suitable means of driving the parts.

Figure 1:
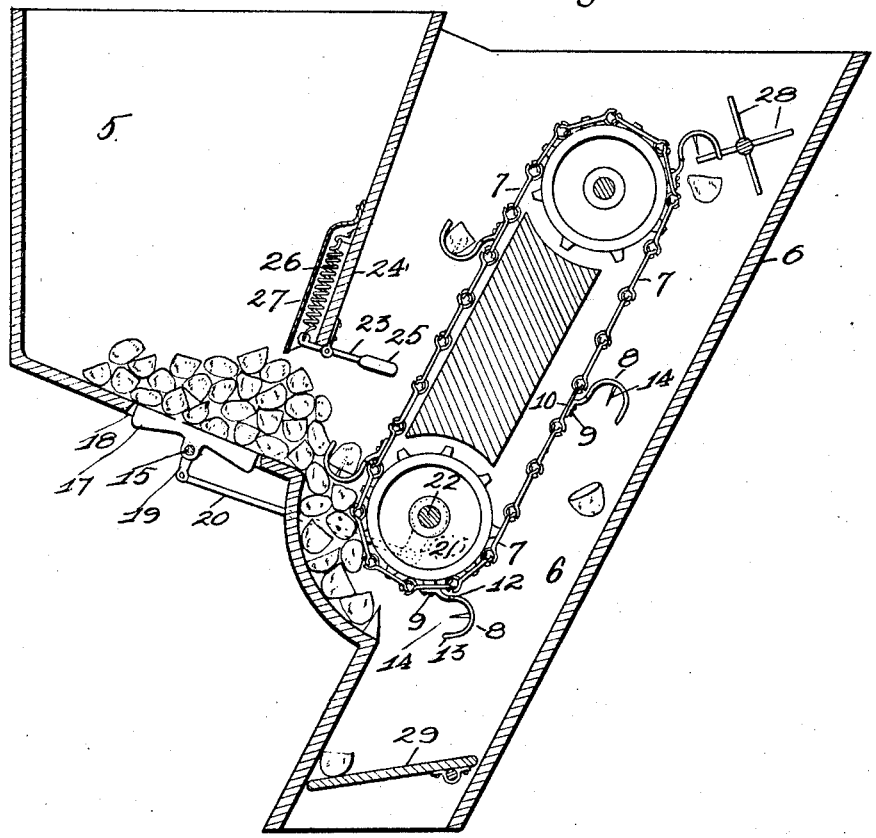
Figure 2:
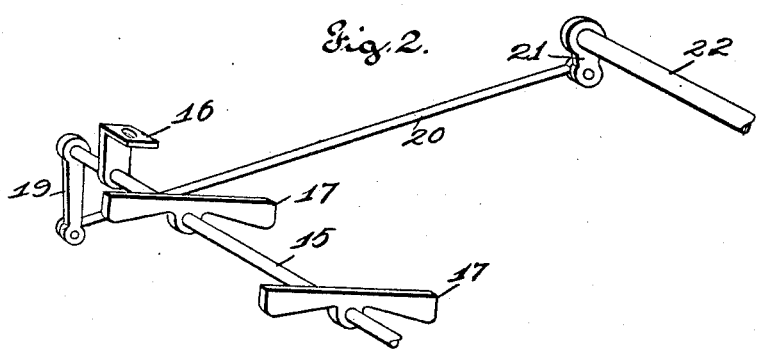

Figure 1 is a vertical central section through the hopper and chute. Fig. 2 is a view in perspective of the agitator and means of driving the same. Fig. 3 is a view in perspective, upon an enlarged scale, of one of the pickers. Fig. 4 is a view in perspective of the presser-arm which presses the potatoes onto the pickers.

Referring to the drawings in detail, the hopper 5 is suitably mounted, and the chute 6 is mounted beside the hopper or formed integral therewith, said hopper discharging into the chute. The chain-carrier 7 is mounted in the chute and the pickers 8 are attached to the carrier 7. The pickers 8 are constructed as shown in detail on Fig. 3 and comprising an arm 9, attached to one of the side bars of the link 10 and extending downwardly and forwardly, the semicircular finger 11 extending downwardly and forwardly from the arm 9, the arm 12 extending laterally from the lower end of the arm 9, and the semicircular finger 13 extending downwardly and forwardly from the outer end of the arm 12, parallel with the finger 11, and the teeth 14 extending upwardly, one from the center of each of the fingers 11 and 13. The rock-shaft 15 is attached to the bottom of the hopper by means of the brackets 16, and the agitator-arms 17 are mounted upon the rock-shaft and vibrate through the openings 18 in the bottom of the hopper as required to stir up the potatoes.

A crank-arm 19 is fixed upon the end of the shaft 15, and a connecting-rod 20 connects the crank-arm 19 to the crank-arm 21, fixed upon the end of the carrier-shaft 22, so that as the carrier-shaft 22 rotates the arms 17 are vibrated to stir up the potatoes in the hopper.

The presser-arm 23 is pivotally attached to the lower end of the partition-wall 24, which separates the hopper from the chute, the presser 25 of said arm being in position to strike on top of the potato as it is carried upwardly by the carrier. The retractile coil-spring 26 is mounted in the casing 27 and connected to the end of the opposite end of the arm 23 from the presser 25 as required to press said presser 25 yieldingly against the potato and press the potato onto the teeth 14.

The beaters 28 are mounted in the upper part of the chute in position to knock the potatoes off of the pickers, so that said potatoes will fall downwardly upon the dropper-plate 29, which is located in the lower part of the chute and which is operated by a check-row wire or in any suitable way to regulate the fall of the potatoes from the chute.

I claim—

1. The improvement in potato-planters consisting of a hopper; a chute into which the hopper discharges; a carrier operating in said chute; pickers upon said carrier; an agitator in said hopper; a presser-arm yieldingly mounted in position to press the potatoes onto said pickers; beaters in position to knock the potatoes off of said pickers; a dropper-plate for regulating the passage of the potatoes from said chute; and suitable means of driving the parts, substantially as specified.

2. In a potato-planter, a hopper; a chute into which the hopper discharges; a carrier operating in said chute; pickers upon said carrier; and a presser-arm yieldingly mounted in position to engage the potatoes and press them onto the pickers, substantially as specified.

3. In a potato-planter, a hopper; a chute into which the hopper discharges; a carrier operating in said chute; pickers upon said carrier; a rock-shaft attached to the bottom of the hopper; agitator-arms mounted upon the rock-shaft to vibrate through the openings in the bottom of the hopper, and stir up the potatoes; a crank-arm fixed upon the end of the rock-shaft; a second crank-arm fixed upon the end of the carrier-shaft; and a connecting-arm connecting said crank-arms, the first crank-arm being longer than the second crank-arm, so that as the crank-shaft rotates, the agitators will be vibrated, substantially as specified.

4. In a potato-planter, a hopper; a chute into which the hopper discharges; a carrier operating in said chute; and pickers upon said carrier, said pickers comprising the arm 9 secured to the link of the chain, and extending outwardly and downwardly, the semicircular finger 11 extending downwardly and outwardly from the lower end of said arm, the arm 12 extending laterally from the lower end of the arm 9; the finger 13 extending downwardly and outwardly from the arm 12, and the teeth 14 extending upwardly from the centers of the fingers 11 and 13, substantially as specified.

In testimony whereof I affix my signature in presence of two witnesses.

THOMAS LELAND GOOD.

Witnesses:
S. W. McKITTRICK,
W. I. WILSON.